(12) United States Patent　　(10) Patent No.: US 12,560,740 B2

Massonnat et al.　　(45) Date of Patent: Feb. 24, 2026

(54) METHOD FOR MODELLING THE FORMATION OF A SEDIMENTARY BASIN USING A STRATIGRAPHIC FORWARD MODELING PROGRAM

(71) Applicant: TotalEnergies OneTech, Courbevoie (FR)

(72) Inventors: Gérard Massonnat, Pau (FR); Fanny Bastide, Pau (FR)

(73) Assignee: TotalEnergies One Tech, Courbevoie (FR)

( * ) Notice: Subject to any disclaimer, the term of this patent is extended or adjusted under 35 U.S.C. 154(b) by 1122 days.

(21) Appl. No.: 17/610,074

(22) PCT Filed: May 10, 2019

(86) PCT No.: PCT/IB2019/000613

§ 371 (c)(1),
(2) Date: Nov. 9, 2021

(87) PCT Pub. No.: WO2020/229868

PCT Pub. Date: Nov. 19, 2020

(65) Prior Publication Data

US 2022/0236449 A1　　Jul. 28, 2022

(51) Int. Cl.
G01V 20/00 (2024.01)

(52) U.S. Cl.
CPC ........ G01V 20/00 (2024.01); *G01V 2210/661* (2013.01)

(58) Field of Classification Search
CPC ... G01V 20/00; G01V 99/00; G01V 2210/661
See application file for complete search history.

(56) References Cited

U.S. PATENT DOCUMENTS 6,754,588 B2 * 6/2004 Cross ..................... G01V 11/00
　　　　　　　　　　　　　　　　　　　702/11
7,337,069 B2 * 2/2008 Masson .................. G01V 1/282
　　　　　　　　　　　　　　　　　　　702/14

(Continued)

OTHER PUBLICATIONS

Alqattan, H., et al. "Moving Models into Reality: An Automated Workflow to Calibrate Forward Stratigraphic Modeling; Application to Hanifa and Arab-D in Central Saudi Arabia" Society of Petroleum Engineers, SPE-188920-MS (2017) (Year: 2017).*

(Continued)

*Primary Examiner* — Jay Hann
(74) *Attorney, Agent, or Firm* — Seed Intellectual Property Law Group LLP

(57) ABSTRACT

A method for modelling the formation of a sedimentary basin using a stratigraphic forward modelling program is disclosed, wherein the stratigraphic forward modelling program simulates the superposition of successive layers of sediments, each layer of sediments corresponding to a determined period of time, the method comprising: a. Receiving a facies log comprising a succession of layers of different facies, b. determining environmental conditions associated to at least some of the facies of the facies log to infer an environmental factor log, c. determining from the facies log a number of layer of sediments and a thickness of each layer of sediments to be simulated by the stratigraphic forward modelling program for modelling the facies log, and d. determining, from the environmental factor log, environmental parameters associated to the layers of sediments to be simulated by the stratigraphic forward modeling program such that the superposition of the simulated layers or sediments corresponds to the facies logs.

13 Claims, 7 Drawing Sheets

(56)     References Cited

U.S. PATENT DOCUMENTS

| | | | | |
|---|---|---|---|---|
| 9,514,096 | B2 * | 12/2016 | Granjeon | G01V 20/00 |
| 10,087,723 | B2 * | 10/2018 | Harris | E21B 43/00 |
| 10,108,760 | B2 * | 10/2018 | Sun | G01V 20/00 |
| 11,506,804 | B2 * | 11/2022 | Zhang | G01V 1/306 |
| 2014/0222403 | A1 * | 8/2014 | Lepage | G01V 20/00 |
| | | | | 703/6 |
| 2015/0212234 | A1 | 7/2015 | Massonnat | |
| 2017/0175492 | A1 | 6/2017 | Harris et al. | |
| 2017/0329030 | A1 | 11/2017 | Massonnat | |
| 2020/0278474 | A1 * | 9/2020 | Ross | G06Q 10/04 |

OTHER PUBLICATIONS

Andres et al., "Conditioned Forward Stratigraphic Modeling in Large Carbonate Fields: A Dionisos Model of Karachaganak," Search and Discovery Article #40352, Posted Nov. 20, 2008, 24 pages.

Deschamps et al., "The coal-bearing strata of the Lower Cretaceious Mannville Group (Western Canadian Sedimentary Basin, South Central Alberta). Part 1: Stratigraphic architecture and coal distribution controlling factors," *International Journal of Coal Geology* 179:113-129, 2017.

Fagherazzi et al., "Dynamics of river mouth deposits," *AGU Publications—Reviews of Geophysics,* Review Article, 10.1002/2014RG000451, 2015, pp. 642-672.

Robin et al., "Expression and modelling of stratigraphic sequence distortion," *Sedimentary Geology* 178:159-186, 2005.

* cited by examiner

METHOD FOR MODELLING THE FORMATION OF A SEDIMENTARY BASIN USING A STRATIGRAPHIC FORWARD MODELING PROGRAM

FIELD OF THE INVENTION

The invention relates to a computer-implemented method for modelling the formation of a sedimentary basin using a stratigraphic forward modelling program, and taking into account data corresponding to wells belonging the sedimentary basin to increase the accuracy of the simulation performed by the program.

TECHNICAL BACKGROUND

Many techniques are known to model hydrocarbon reservoirs, in order to better understand their geological structure, the properties of the rocks which make them up, and eventually in order to be able to accurately define the geometry of a hydrocarbon reservoir and evaluate its dimensions, in order to setup the best exploration and production strategy of the reservoir.

Some methods are known in which a reservoir model is built, comprising a number of cells where some cells are assigned petrophysical parameters obtained from wells belonging to the reservoir to be modelled. These methods comprise an upscaling of the cells to obtain averaged values of the petrophysical parameters, and then implementing geostatistical techniques to infer values of the petrophysical parameters within the whole reservoir from the local values gathered from the wells. Some other methods are not based on experimental data. Among these methods, stratigraphic forward modelling programs are known, which are computer programs simulating the formation of a sedimentary basin by simulating the successive deposition of layers of sediments, where each layer of sediments corresponds to a determined period of time, and can thus be called a "time-layer".

Running a stratigraphic forward modelling program can help gather a better understanding of the formation of a whole sedimentary basin. However, when it comes to comparing the result of the modelling with experimental data obtained from wells belonging to the sedimentary basin, there is most of the time a great discrepancy between the two. This is mainly due to the fact that, at no time, experimental data is taken into account to check or correct the accuracy of the simulation performed by the forward modelling program.

One particular problem of correlating the simulation obtained by a forward modelling program with experimental data is associating to each time layer simulated by the program a thickness of deposited sediments, in order to establish a correspondence between a facies log corresponding to a well belonging to the basin, wherein the facies log comprises a series of facies layers of known thicknesses, and the superposition of time layers simulated by the program.

PRESENTATION OF THE INVENTION

The invention aims at providing a solution to the problem identified above. In particular, one aim of the invention is to correlate experimental data obtained from wells belonging to a sedimentary basin, to a model of the sedimentary basin obtained by running a stratigraphic forward modelling program, whereby the program is adapted to simulate the deposition of successive layers of sediments, each layer corresponding to a determined period of time.

Accordingly, a computer-implemented method for modelling the formation of a sedimentary basin using a stratigraphic forward modelling program is disclosed, wherein the stratigraphic forward modelling program simulates the superposition of successive layers of sediments, each layer of sediments corresponding to a determined period of time, the method comprising steps of:

a. receiving a facies log corresponding to an initial state of at least one well belonging to the sedimentary basin to be modelled, wherein the facies log comprises a succession of layers of different facies wherein each layer extends from a respective depth with a respective thickness, b. determining environmental conditions associated to at least some of the facies of the facies log to infer, for at least one environmental factor, an environmental factor log associated to the facies log, c. determining, from the facies log a number of layer of sediments and a thickness of each layer of sediments to be simulated by the stratigraphic forward modelling program for modelling the facies log, and d. determining, from the environmental factor log associated to the facies log, environmental parameters associated to the layers of sediments to be simulated by the stratigraphic forward modeling program such that the superposition of the simulated layers or sediments corresponds to the facies logs.

In embodiments, step a. comprises receiving a current facies log corresponding to a current state of the well, and processing the current facies log to form the facies log corresponding to the initial state of the well.

In embodiments, step b. comprises loading a library assigning to each of a plurality of facies an associated production model comprising at least one type of element and at least one environmental factor, and inferring from the library at least one environmental factor value and/or at least one element corresponding to each facies layer of the facies log.

In embodiments, the environmental factors are chosen among the group consisting of:

Water depth,

Salinity,

Temperature, pH level,

Slope of a sedimentary surface on which sediments are deposited,

Water current velocity,

Volcano activity,

Spring activity

River activity,

Variation of water depth between the periods of time corresponding to the deposition of two successive layers of sediments.

In embodiments, wherein environmental conditions associated to one facies comprise minimum and maximum values of an environmental factor, and the determination of an environmental factor log comprises:

computing an average value of the environmental factor for each facies of the facies log from the respective minimum and maximum values associated to each facies, the succession of average values corresponding to each facies of the log forming an environment factor log, and smoothing the environment factor log.

In embodiments, step a. comprises the reception of at least two facies logs corresponding to the initial states of two respective wells belonging to the sedimentary basin to be modelled, and step b. further comprises establishing correlations between the facies logs from the environmental factor logs established for each facies log and identifying, from the established correlations, parts of each facies log corresponding to a same time interval.

In embodiments, the environmental factor logs established at step b. comprise, for each facies log, at least an environment factor log corresponding to an environment factor which is, at a given time, homogeneous over the sedimentary basin, and comprises, for each part of the facies log corresponding to a time interval, a range of values of said homogeneous environmental factor, and step d. comprises assigning a value of the environmental factor to at least one layer of sediments to be modelled in order to represent facies layers of the part of the facies logs corresponding to the same time interval, said value being comprised in the intersection of the ranges of values of the environmental factor associated to the part of each facies log corresponding to said time interval.

The method may comprise, if there is no intersection of the ranges of values of the environmental factor associated to the facies layer of each facies log corresponding to said time interval, the definition of a reference facies log, and the value assigned to the layer of sediments to be modelled is chosen among the range of values of the environmental factor associated to the facies layer of the reference facies log corresponding to said time interval.

In embodiments, step d. comprises inferring, from each facies log, a maximum water current velocity at water bottom associated to each transported facies layer,
the method further comprises running the stratigraphic forward simulation model to model the formation of the sedimentary basin, and thereby obtaining a simulated water current velocity at a time and location corresponding to the formation of the transported facies layer of the facies log for which the maximum water current velocity has been inferred,
and step d. further comprises:
computing an error between the maximum water current velocity and the simulated water current velocity,
extrapolating the computed error over the sedimentary basin, and
computing corrected simulation values of water current velocity from values simulated by the program and the error computed over the sedimentary basin.
In embodiments, step c. comprises:
determining an average deposition rate of the facies over each facies log, expressed as an average thickness of deposited sedimentary elements during the period of time corresponding to each layer of sedimentary elements,
determining the number of layers of sediments to be simulated in order to model each facies log, from the average deposition rate of the facies, a number of different facies within the facies log, and a thickness of each facies layer.
Step c. may further comprise determining the thickness of each layer of sediments to be simulated, by:
computing an average thickness of the layers of sediments as the overall thickness of the facies log divided by the number of layers of sedimentary elements to be simulated in order to model the facies log, and adjusting the thickness of each layer such that a change between two successive facies in the facies log corresponds to an interface between two successive layers of sediments.
According to another aspect, a computer program product is disclosed, comprising code instructions for implementing the method according to the above disclosure, when it is executed by a processor.

According to another aspect, a non-transitory computer readable storage medium is disclosed, having stored thereon a computer program comprising program instructions, the computer program being loadable into a processor and adapted to cause the processor to carry out, when the computer program is run by the processor, the method according to the above disclosure.

According to still another aspect, a device for modelling the formation of a sedimentary basin is disclosed, the device comprising a computer configured to implement the method according to the above disclosure.

BRIEF DESCRIPTION OF THE DRAWINGS

The present invention is illustrated by way of example, and not by way of limitation, in the figures of the accompanying drawings, in which like reference numerals refer to similar elements and in which.

DETAILED DESCRIPTION OF AT LEAST ONE EMBODIMENT OF THE INVENTION

Figure 9:
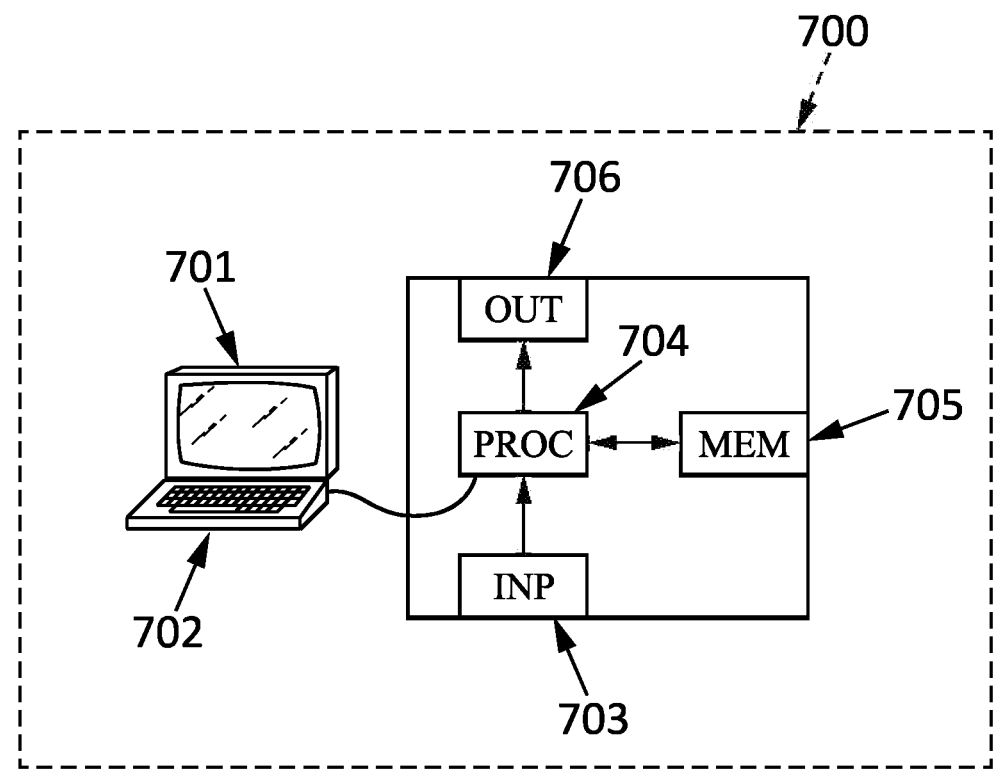
FIG. 9 represents a computing device for implementing the method according to an embodiment of the invention.

The main steps of a method for setting parameters of a stratigraphic forward modelling program, to model the formation of a sedimentary basin, will now be described. With reference to FIG. 9, this method is implemented by a computing device 700 which comprises a computer, this computer comprising a memory 705 to store program instructions loadable into a circuit and adapted to cause circuit 704 to carry out the steps of the present invention when the program instructions are run by the circuit 704.

The memory 705 may also store data and useful information for carrying the steps of the present invention as described above.

The circuit 704 may be for instance:

a processor or a processing unit adapted to interpret instructions in a computer language, the processor or the processing unit may comprise, may be associated with or be attached to a memory comprising the instructions, or the association of a processor/processing unit and a memory, the processor or the processing unit adapted to interpret instructions in a computer language, the memory comprising said instructions, or an electronic card wherein the steps of the invention are described within silicon, or a programmable electronic chip such as a FPGA chip (for «Field-Programmable Gate Array»).

This computer comprises an input interface 703 for the reception of several data used for the method described below. This computer also comprises an output interface 706 for outputting the parameters determined according to this method.

To ease the interaction with the computer, a screen 701 and a keyboard 702 may be provided and connected to the computer circuit 704.

Preferably, the computing device 700 implementing the method described below is the same computing device 700 running the stratigraphic forward modelling program, and thus the memory 705 stores instructions for executing said program.

Stratigraphic Forward Modelling Program

The stratigraphic forward modelling program is configured to simulate the superposition of successive layers of sediments on an initial topography, wherein each layer of sediments corresponds to a determined period of time and can also be called a time-layer.

The initial topography can for instance be a gridded model of an area, comprising a plurality of cells each having a position (x,y) and a height parameter z. The area being a marine area in order to simulate deposition of sediments thereon, each cell of the topography is preferably assigned a water depth which is computed from a sea water level and the height of the cell.

The successive deposition of layers of sediments induces successive changes in the initial topography, and in particular in the height parameter and the water depth associated to each cell.

Preferably, the stratigraphic forward modelling program is also configured to simulate subsidence on the topography, at the end of each simulation of a time layer, the subsidence also inducing a change in the height parameters assigned to some cells. The amount of subsidence can vary along the topography. The stratigraphic forward modelling program may also be configured to simulate eustatism over the topography, which is a variation of the sea level.

The stratigraphic forward modelling program can be parameterized to set, before launching a simulation, the period of time corresponding to each time layer, and the overall period of time to be simulated using a superposition of time layers. Furthermore, the setting parameters comprise at least one type of sediments supply process among a plurality of supply processes comprising for instance:

Rivers,
Travertine sources,
Volcanoes,
In-situ production of carbonates,

Remobilization of carbonates or travertine (for instance if a piece thereof is broken by a current, it can be transported and deposited again), Etc.

Moreover, each supply process may further be parameterized to set a production model comprising a maximum production rate of sediments of each supply process, which is expressed as a maximum thickness of deposited sedimentary elements per time layer, i.e. for the period of time corresponding to a time layer. The actual production rate per time layer may optionally be reduced by a coefficient set by the user at each time layer in order to take into account phenomena that may reduce the amount of supplied elements.

The production model corresponding to a supply process also comprises the definition of at least one element which is supplied by the process, and, if there are at least two elements supplied by the process, the respective proportions of the elements. In all that follows, an element is a type of sediment simulated by the program. The elements which can be supplied in the supply process simulated by the program are for instance chosen among the following list:

Sandstone,
Travertine,
Sand
Basalt
Calcareous
Shale
Silt,
Debris of shells
Corals, etc.

The stratigraphic forward modelling program is also preferably configured to allow parameterizing the location of some sources of elements such as rivers, volcanoes, travertine sources, etc.

Before launching a simulation, the stratigraphic forward modelling program also allows parameterizing a number of environmental factors which have an impact on the deposition of sediments. This parametrization can comprise assigning a fixed value or a fixed range of values to an environmental factor for all the time layers to be modelled to simulate the overall period of time. Alternatively, a value or a range of value may be assigned to an environmental factor for only one time layer, and can be changed between one time layer and the next.

Preferably, the environmental factors that can be parameterized comprise at least one parameter chosen among the following list:

Salinity of sea water,
Amount of oxygen in water,
Water Temperature,
pH level,
Water current velocity,
Volcano activity,
Spring activity
River activity,
Water accommodation, which is the variation of the water level between one time layer and the next, computed from the variation in sea level induced by eustatism and the variation of the ground level induced by subsidence.

Additional factors that can be parameterized may also be set by the user.

Regarding volcano, spring and river activities, these parameters allow modulating the production model defined for each of these supply processes, for at least a given time layer.

Regarding water current velocity, the stratigraphic forward modelling program may also be configured to allow simulating at least one water current, and defining or computing the location at which occurs said water current, and the velocity of said water current in each cell where it occurs.

Method for Setting Parameters of the Stratigraphic Forward Modelling Program

Figure 1:
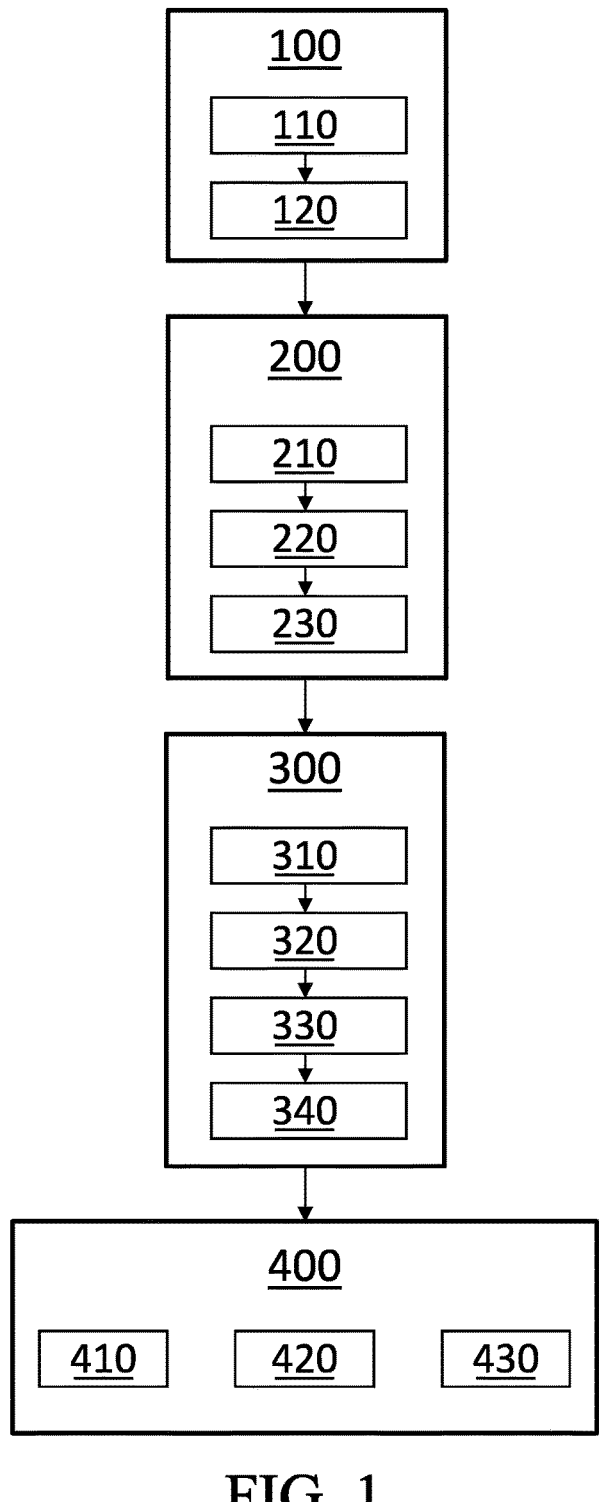
FIG. 1 is a flow chart describing a possible embodiment of the method according to the invention, FIG. 2 schematically represents an example of facies log restoration.

With reference to FIG. 1, the method according the invention uses experimental data obtained from wells belonging to the sedimentary basin to be modelled using the stratigraphic forward modelling program, to increase the accuracy of the simulation.

Figure 2:
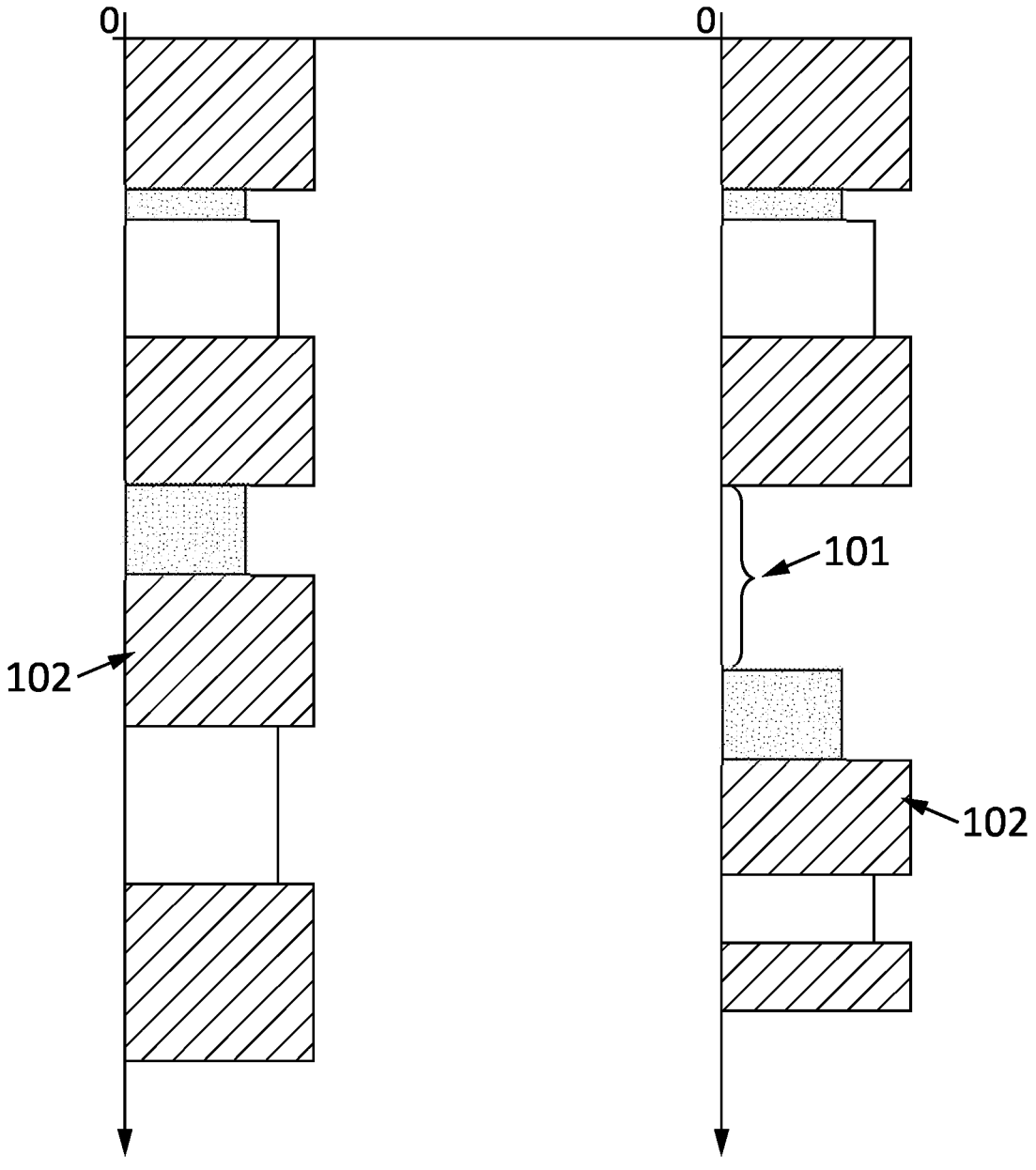

It thus comprises a step 100 of receiving a facies log corresponding to an initial state of at least one well belonging to the sedimentary basin, wherein the facies log comprises a succession of layers of different facies, each layer extending from a respective depth with a respective thickness, as shown for instance in FIG. 2 where facies logs are represented along a depth axis.

In all that follows, a facies is a type of sediment, reflecting a particular process or environment for sedimentation. Therefore a facies is associated to at least one or a plurality of elements, and are often also associated to at least one environmental factor, such as a maximum slope value of the ground, a minimum or maximum velocity value or marine current, a range of temperatures values, etc.

In an embodiment of the method, only one facies log corresponding to one well is received. In other embodiments, a plurality of facies log corresponding to each of a plurality of respective wells, each belonging to the sedimentary basin to be modelled, are received.

Well Restoration

In an embodiment, step 100 comprises the reception 110 of a facies log corresponding to a current state of the well, and a step 120 of so-called well restoration, which comprises processing the log corresponding to the current state of the well to infer a restored log corresponding to the initial state of the well.

In particular, this step can comprise taking into the effects of erosion, compaction, or the occurrence of a fault between an initial state of the well and its current state.

FIG. 2 shows on the left-hand side of the figure a facies log corresponding to a current state of a well, and on a right-hand side of the figure a facies log corresponding to an initial state of the same well.

As can be seen on this figure, well restoration can comprise insertion of additional facies layers or empty segments in the facies log (101) to take into account lithological layers that have been eroded. It can also comprise modifying the thickness of a facies layer (for instance layer 102), to take into account compression, partial erosion, or a fault which has changed the apparent thickness of a facies layer. It can also comprise deleting a facies layer from the layer corresponding to the current state of the well, also for taking into account a fault. According to an embodiment, step 120 of well restoration may be performed according to the method described in WO 2014/023910.

In another embodiment, the well restoration may have been primarily performed by another computing device and step 100 comprises receiving from this other computing device, or loading from a memory, the facies log corresponding to the initial state of the well.

Environmental Factors Logs

Back to FIG. 1, the method then comprises a step 200 of determining environmental conditions associated to at least some of the facies of each facies log to infer, for at least one environmental factor, an environmental factor log associated to the restored facies log.

Step 200 comprises a substep 210 of loading a correspondence table between each of a plurality of facies types and elements and associated environmental conditions. This correspondence table is preferably pre-established and stored in the memory 705.

Then for each facies layer of a facies log, step 200 comprises inferring 220 from the correspondence table one or more elements which are present in the facies, and environmental conditions which are necessary for the facies to appear. These environmental conditions can be expressed as maximum and/or minimum values of at least one environmental factor.

An environmental factor log may thus be formed from the environmental conditions inferred from the succession of facies in the facies log, each environmental factor log corresponding to a single environmental factor.

Figure 3:
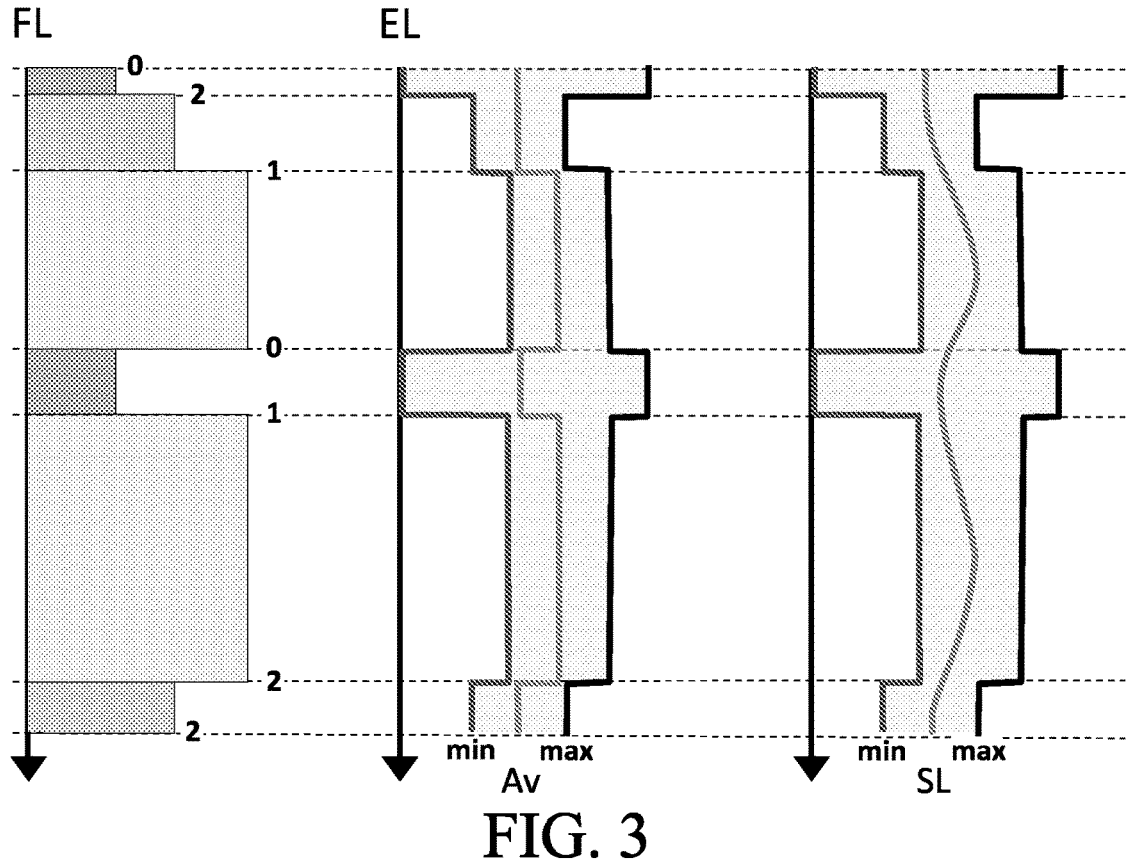
FIG. 3 represents an example of environmental factor log associated to a facies log.

As shown for instance in FIG. 3, the environmental factor log, denoted EL, is thus a representation, according to depth, of the possible values of an environmental factor, where each value or range of values corresponds to a facies layer of the facies log, denoted FL, and therefore extends from the same depth and along the same thickness as the corresponding facies layer.

Therefore, a plurality of environmental factor logs may be generated from one facies log, comprising for instance a temperature log, water current velocity log, an accommodation log, etc.

According to a possible embodiment, the values of an environmental factor inferred at step 220 for at least one facies of the facies log comprise a minimum and a maximum values. In this case, step 200 may comprise a further step 230 of computing, for each facies layer for which minimum and maximum values have been inferred, an average value of the environmental factor. The average value is shown as Av in FIG. 3, which represents an environmental factor log EL obtained from a facies log FL.

Then optionally step 230 can comprise smoothing the values obtained for the environmental factor along the environmental factor log, to obtain a continuum of values over all the depth of the environmental factor log. The right-hand side of FIG. 3 shows the smoothed values SL obtained for the environmental factor log.

According to a possible embodiment, in the case where the reception step 100 comprises the reception of at least two facies logs corresponding to respective wells belonging to the sedimentary basin to be modelled, step 200 may further comprise establishing at least one correlation between the facies logs, the correlation being inferred from the environmental factor log inferred from each facies log. A correlation between two facies logs is a temporal correlation, i.e. it is an indication that two facies layers belonging respectively to two facies logs correspond to a same era, even though for example the facies layers may not have the same thickness or may not be preceded or followed from the same type of facies. According to another example, a correlation can also be an indication that a change between two facies layers of a facies log occurred at the same time that a change between two facies layers of the other facies log.

A correlation can also be inferred from a particular event that has occurred at the same time in two wells, such as for instance a fault, a volcanic eruption, a seismic marker, etc.

Figure 4:
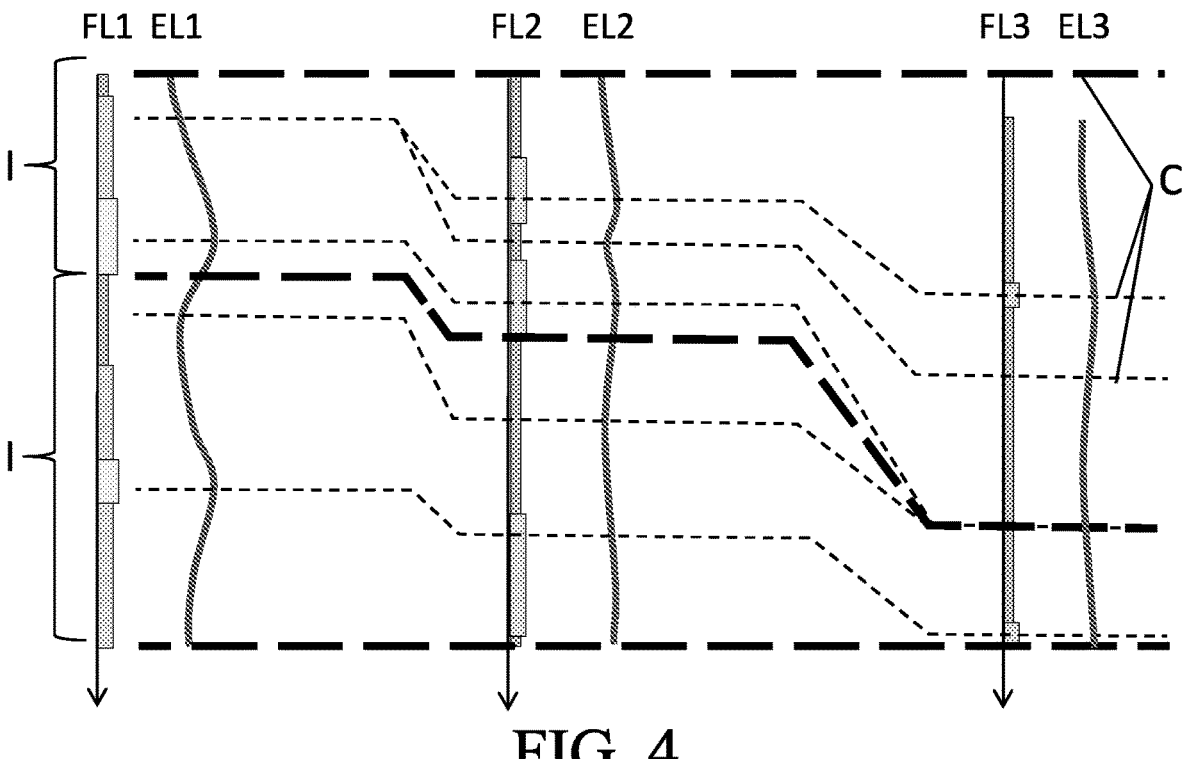
FIG. 4 represents correlation established between environmental factor logs obtained from different wells.

In FIG. 4 is shown an example of correlations C established between three facies logs FL1, FL2, FL3 corresponding to three respective wells. An environmental factor log EL1, EL2, EL3 corresponding to the same environmental factor has been generated for each facies log, and from the environmental factor logs the correlations C are established. They can be established manually by a user, or automatically based on a defined criterion, such as a local extremum of the environmental factor log.

According to this embodiment, the establishment of correlations from environmental factors allows determining time intervals I which are common for the at least two processed facies logs, said time intervals corresponding to parts of the facies log formed during this time interval. The time intervals can be inferred from the correlations between two logs, for instance by identifying two events which appear in two facies logs, and defining a time interval as the time elapsed between the two events. Each facies log may then be divided in a number of intervals, each comprising at least one facies, wherein each interval corresponds to a time interval established between correlations. Two intervals are defined in FIG. 4, which are common for all three facies logs.

Grid Resolution

Back to FIG. 1, the method then comprises a step 300 of determining, for each facies log corresponding to an initial state of a well, a number of time layers, or layers of sediments, to be simulated by the stratigraphic forward modelling program for modelling the facies log, and a thickness of each layer of sediments, in order for the succession of layers of sediments to correspond to each facies log. Thus, each facies layer of the facies log is modelled by at least one corresponding layer of sediments simulated by the stratigraphic forward modelling program, and a relationship is established between the duration of a time layer (i.e. the period of time represented by one layer of sediments of the program) and the thickness of each facies layer.

A first substep 310 of step 300 comprises determining, for each facies of each facies log, an average deposition rate of the facies per time layer, and a maximum deposition rate of the facies per time layer, from the elements constituting the facies. As indicated above, each element of the stratigraphic forward modeling program is associated to a maximum production rate per time layer which has been set initially with the other parameters of the program, as well as the period of time corresponding to each time layer.

Hence, substep 310 comprises determining, among the elements constituting each facies, those that are transported and those that are produced locally and the relative proportions of those elements.

The average deposition rate and maximum deposition rate of the facies per time layer may then be computed from the maximum production rate of the elements produced locally $PE_p$, and the proportion of the locally produced elements within the facies. For instance, the maximum deposition rate may be the maximum production rate of the elements produced locally multiplied by the proportion of said elements within the facies, and the average deposition rate may be half the maximum deposition rate.

According to one example, a facies F1 comprises one transported element $E_t$ and one locally produced element $E_p$ in the following proportions:

$$F1=0.4E_p+0.6E_t$$

Then the maximum deposition rate can be computed as:

$$P_M=PE_p*0.4$$

And the average deposition rate can be computed as $$P_m=(PEp/2)*0.4.$$

If the facies comprises more than one component produced locally, then the average and maximum deposition rates may be computed from the maximum production rate of each element and the relative proportions of the elements within the facies.

According to another example, a facies F2 comprises one transported element Et and two locally produced elements $E_{pa}$, $E_{pb}$, in the following proportions:

$$F2=0.3E_{pa}+0.3E_{pb}+0.4E_t$$

Then the maximum deposition rate can be computed as:

$$P_M=PE_{pa}*0.3+PE_{pb}*0.3$$

where PEpa is the maximum production rate of element $E_{pa}$ and PEpb is the maximum production rate of element $E_{pb}$.

The average deposition rate can be computed as:

$$P_m=(PE_{pa}*0.3+PE_{pb}*0.3)/2$$

Then, average and maximum deposition rates over the whole facies log may be computed from respectively the average and maximum deposition rates of the facies composing the log, weighted by the thickness of each facies within the log.

For instance, the average deposition rate of the log may be the average of the average deposition rates of the facies composing the log, weighted by the thicknesses of the facies composing the log.

The maximum deposition rate of the log may be the minimum of the maximum deposition rates of the facies composing the log.

Once a maximum and an average deposition rates have been determined for each facies, step 300 comprises determining 320 a number of layers of sediments to be simulated in order to model the facies log. This number of layers of sediments is determined based on:

the average deposition rate of each facies, the number of locally produced facies in the log, wherein a facies is considered locally produced if it comprises at least 10% of locally produced element, The number of transported facies in the log, and the thickness of each facies layer.

The number of layers of sediments is determined differently for facies which are locally produced and transported facies.

Regarding locally produced facies, the number of layers of sediments is computed from the total thickness of the facies layers of the locally produced type within the log, divided by the average deposition rate of the facies along the log. Additionally, the computed number of layers of sediments must be at least equal to the number of facies changes along the log+1.

According to an example, if the average deposition rate of the facies along the log is 10 meters per time layer, and the facies log comprises 2 locally produced facies changes with a cumulative thickness of 100 meters, then the number of layers of sediments to represent these facies is 10.

If the facies log comprises 5 different locally produced facies (i.e. 4 facies changes) with a cumulative thickness of 100 meters, then the number of layers of sediments to represent these facies is 5.

Regarding transported facies, the number of layers of sediments is computed from the number of transported facies changes along the log, and is equal to this number+1, independently from the thickness of each facies layer.

According to an example, if the facies log comprises 4 different transported facies (i.e. 3 facies changes), the number of layers of sediments to represent these facies is 4.

Last, the total number of layers of sediments to be simulated to model the facies log is the sum of the number of layers of sediments to be simulated to model the transported facies and to model the locally produced facies.

According to an embodiment, if common time intervals have been defined for the facies log, then substep 320 of determining a number of layers of sediments to represent each facies log may be performed separately for each interval of each facies log, based on the number of locally produced facies and of transported facies of each interval.

A total number of layers of sediments to represent each interval is computed by summing the number of layers of sediments required to represent the transported and locally produced facies of the interval.

Figure 5:
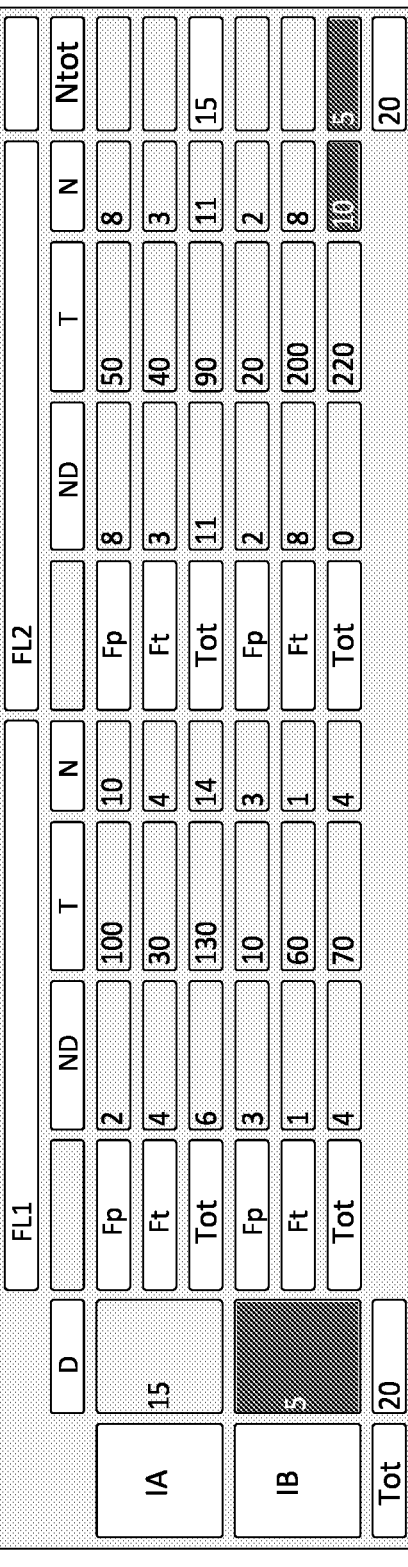
FIG. 5 represents an exemplary implementation of a step of determining a number of layers of sediments and a thickness of each layer of sediments to be modelled by the forward stratigraphic modelling program to correspond to factor logs obtained from respective wells.

This is shown for instance in FIG. 5, which represents an example of graphical interface for displaying the method, in which for each facies log FL1, FL2, the duration D of each interval IA, IB is represented, as well as the total duration of the facies logs Tot.

For each facies log, and each interval I, are shown:
the number ND of different facies of the type locally produced facies Fp and transported facies Ft,
cumulative thickness T of the facies of each type within each interval,
the computed number N of layers of sediments to represent each type of facies,
The total values of ND, T and N for each interval.

In the example shown in FIG. 5, the period of time corresponding to one time layer is 1 million years, the average deposition thickness per layer of the logs is 10 meters per layer, and the maximum deposition thickness per layer of the logs is 50 meters.

Once a total number of layers of sediments have been determined to represent each facies log, the maximum value over all the facies logs is selected as the number of layers of sediments to be modelled by the stratigraphic forward modelling program to represent all the facies logs.

In FIG. 5, this value appears in the right-hand column showing the number Ntot of layers of sediments to be modelled in order to represent all facies logs.

Step 300 then comprises a substep 330 of checking the consistency of the obtained total number of layers of sediments to be modelled.

In an embodiment, if the total number of layers of sediments to be modelled multiplied by the average deposition rate of the facies along the log exceeds the overall thickness of the facies log, then the method comprises alerting the user in order to reduce either the period of time corresponding to a layer of sediments, and/or the production model of the elements to reduce the amount of deposited sediments per time layer.

In an alternative embodiment which is shown in FIG. 5, the comparison in thickness is replaced by a comparison in duration, wherein an alert is launched if the total number of layers of sediments to be modelled multiplied by the period of time corresponding to a layer of sediments exceeds the total period of time represented by a facies log.

If the facies logs have been decomposed in intervals, then this step 330 can be performed for each interval, i.e. the total number of layers to be modelled to represent one interval, multiplied by the average deposition rate of the facies along the log or the period of time represented by one layer of sediments, is compared respectively to the thickness of the interval or the duration of an interval.

Figure 6:
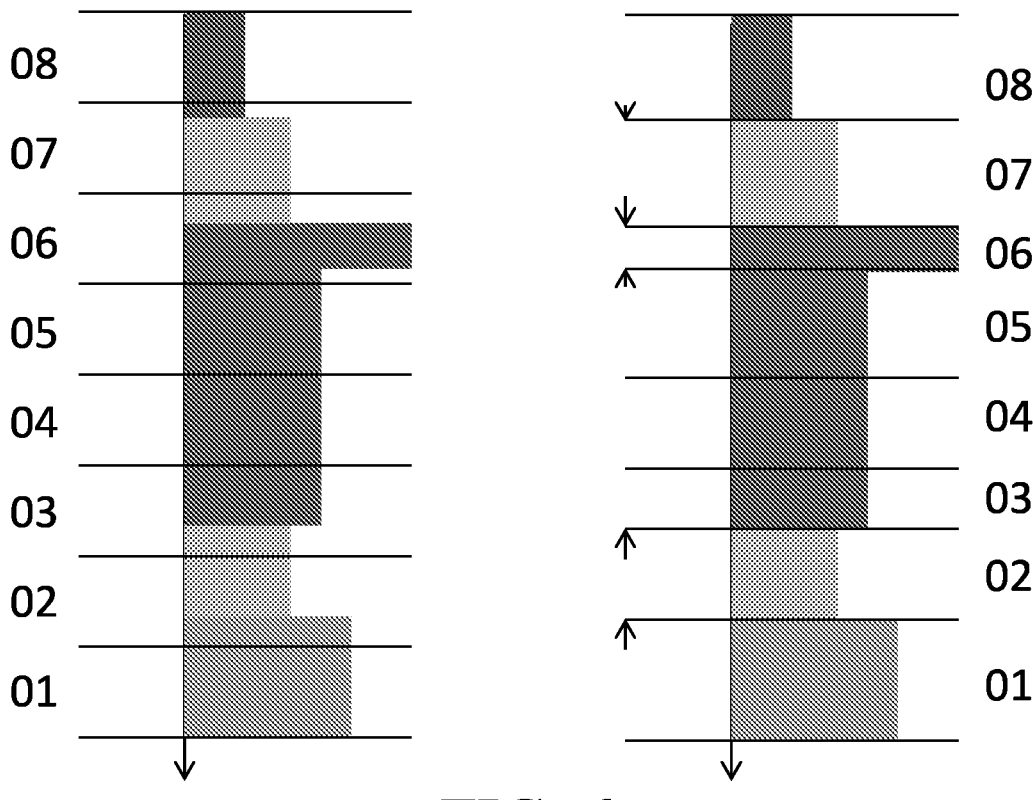
FIG. 6 represents adjusting the thickness of each layer of sediments to be modelled by the forward stratigraphic modelling program.

Step 300 then comprises a substep 340 of determining a thickness of each layer of sediments to be simulated. This substep is preferably performed by determining an average thickness of each layer of sediments, which is equal to the total thickness of the facies log(s) divided by the total number of layers of sediments to represent the log(s). Preferably, with reference to FIG. 6, substep 340 further comprises adjusting the thickness of each layer of sediments so that a change between two successive facies in a facies log corresponds to an interface between two successive layers. The left-hand graph of FIG. 6 represents the thickness of each layer of sediments (from 1 to 8) to be simulated by the program, superposed on the actual facies layers of the facies log, and the right-hand graph of FIG. 6 represents the thickness of each layer of sediments once adjusted to fit the corresponding thickness of the facies layers.

Thus, a thickness is assigned to each layer of sediments to be modelled by the program, which ensures that each layer of sediments will correspond to a facies layer of a facies log. The thickness of each layer of sediments is preferably adjusted locally for each facies log, which implies that the thickness of a layer of sediments can vary along the model.

Environmental Constraints

Back to FIG. 1, the method then comprises a step 400 of determining, from the environmental factor logs associated to each facies log, environmental parameters associated to the layers of sediments to be simulated by the stratigraphic forward modelling program, in order that the superposition of the simulated layers of sediments corresponds to the facies logs.

If there is only one facies log received at step 100, the environmental parameters associated to the layers of sediments to be simulated to represent the facies log are inferred directly from the values of the environmental factor log associated to the facies log.

However if at least two facies logs have been received at step 100 and processed in the following steps of the method, then step 400 is implemented differently according to the type of environmental factor which is considered. In particular, among the environmental factors listed above, some factors are homogeneous over the sedimentary basin to be modelled during the period of time corresponding to one layer of sediments modelled by the program, while other are heterogeneous.

Factors such as water temperature, salinity, pH, etc. are homogeneous over the sedimentary basin, while other factors such as water current velocity or water accommodation are heterogeneous over the sedimentary basin.

The implementation of step 400 requires that correlations have been established at step 200 between environmental factors associated respectively to each facies log, and that parts of the various facies logs corresponding to at least one common time interval have been identified.

In an embodiment, step 400 comprises a substep 410 of inferring, from the environmental factor logs corresponding to at least a homogeneous environmental factor, a value of said environmental factor for the simulation of at least one layer of sediments by the stratigraphic forward modeling program.

This value is inferred from the value of the environmental factor logs established for at least two facies logs, and for parts of the facies logs corresponding to a same period of time (i.e. which can be modelled with a common layer of sediments simulated by the program).

Figure 7:
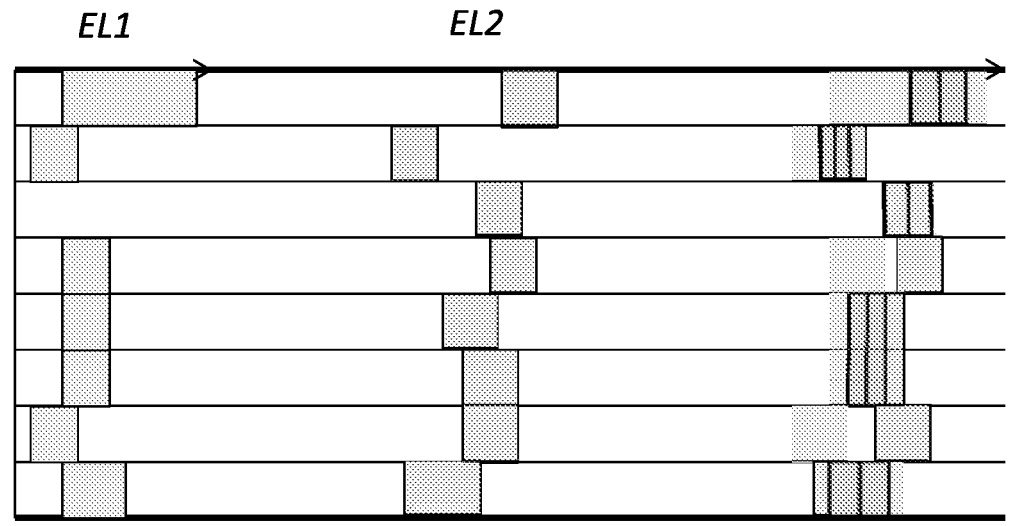
FIG. 7 represents an exemplary implementation of a step of determining environmental factors associated to each layer of sediments to be modelled by the program, in the case of an environmental factor which is homogeneous over the basin at a given time.

In particular, each environmental factor log preferably comprises, for each facies of a facies log, a range of values of the environmental factor. Step 410 then comprises identifying at least one part of each facies log that corresponds to a same period of time, and which can comprise one or more facies layers, and inferring at least one value or a range of values at the intersection of the range of values of the environmental factor associated to each facies log for the same period of time, as shown schematically in FIG. 7, representing the environmental logs EL1, EL2 obtained for two facies logs, with values of the environmental logs assigned to parts of each log corresponding to the same time interval. On the right hand side are shown the ranges of values at the intersection of the ranges of values available for each environmental log, and an average value of each range.

In some cases, there may be no intersection between the values of the environmental factor associated to one facies log and the values associated to another facies log for the same period of time. In that case, a reference facies log has preferably been defined before the implementation of the method, and the values of the environmental factor inferred for the layer of sediments to be simulated is the range of values of the reference log.

In the case where there are more than two facies logs, the values which are selected for the layer of sediments to be simulated can be values at the intersection of a majority of facies logs, or values of an environmental factor log associated to a reference facies log.

Regarding heterogeneous environmental factors, which are either water accommodation or water current velocity, they are processed differently.

According to an embodiment, step 400 comprises a substep 420 of inferring, from water current velocity logs associated to each facies log, values of water current velocity for the forward stratigraphic modelling program.

This substep 420 first comprises inferring 421, from each transported facies of each facies log, a corresponding maximum water current velocity at water bottom, which is the highest velocity at which elements of the transported facies can be deposited. The water currents which are simulated by the program must therefore have a velocity at water bottom lower than said maximum water current velocity in order for the simulation to comply with the facies logs.

Then, the forward stratigraphic modelling program is run, and in particular the program simulates water current and outputs a simulated value of water current velocity at water bottom at the location the well from which the facies log has been obtained, is given by the program. A ratio between the maximum value obtained at step 420 and the simulated value obtained from the simulation program is computed at substep 422. This ratio corresponds to an error of the simulation program An extrapolation of this error is then computed, for instance by 2D Kriging based on an isotropic variogram, to generate a map of the error of the simulation program over the sedimentary basin to be modelled.

Then during a substep 423, the value of the water current velocity at water bottom simulated by the program in each point of the model of the sedimentary basin is multiplied by the error at the same point of the sedimentary basin to obtain a corrected value of the water current velocity at water bottom.

According to an embodiment, step 400 comprises a substep 430 of inferring, from environmental factor logs associated to each facies log, values of water accommodation for the forward stratigraphic modelling program.

According to a first implementation, the environmental factor log associated to each facies log comprises a water depth log, comprising a value or a range of water depths associated to at least some facies of each facies log. A value or a range of water depths can be inferred from the type of element composing the facies, because some elements can only be deposited at some specific water depths.

In the description that follows, parts of facies logs from which water depths and accommodation values are extracted and corresponding to the same time interval will be called facies layers for simplicity, but said parts can comprise only part of a whole facies layer for a given facies log, depending on the correlations that have been made between the facies logs.

If the water depth log comprises a range of water depths for each facies layer of the facies log, an average water depth value is computed from this range.

Then, a water accommodation value Acc is inferred from a value of the water depth associated to each facies layer and the thickness of each facies layer by the following formula:

$$Acc = WD2 - WD1 + eF1$$

Where eF1 is the thickness of a facies layer, WD1 is the water depth corresponding to the facies layer, and WD2 is the water depth of the next facies layer in time, which corresponds to the facies layer located immediately above the first one in the facies log.

Accommodation values are thus obtained at each facies log for each facies layer, and can then be used in the simulation of layers of sediments corresponding to the facies layers of the various facies logs corresponding to the same period of time.

If a single value of water accommodation is desired for each layer of sediments to be modelled, which implies that the same value of water accommodation applies to each facies log, then an average value of water accommodation can be computed from the values of the facies layers of the facies logs corresponding to period of time represented by the layer of sediments to be modelled.

Alternatively, if the water depth log comprises a range of water depths for each facies layer of the facies log, a range of water accommodation can be computed from the ranges of water depths. Then a value or a range of values of water accommodation can be inferred from the ranges of water accommodation available for the various facies logs the same way as exposed in step 410 above.

If there is a difference between the water accommodation associated to a time layer and the value or range of water accommodation at a facies log, then this difference can be set to correspond to local subsidence at the well corresponding to the facies log, and be parameterized as such for the simulation of the time layer.

According to a second implementation, a water depth log is assigned to each facies log, comprising for each facies layer a range of water depths. The initial topography set in the stratigraphic forward simulation program provides a first value of water depth before the deposition of elements corresponding to the first facies layer of each facies log (or the part of each facies log corresponding to the first time layer to be simulated).

A range of water accommodation is then computed, for each facies log, from the range of water depths corresponding to the second facies layer of the log, the thickness of the first facies layer, and the water depth of the first facies layer provided by initial topography, according to the following formulae:

$$Accmin = WD2min - WD1 + e1$$

$$Accmax = WD2max - WD1 + e1$$

Where Accmin and Accmax are minimum and maximum accommodation values, e1 is the thickness of the first facies layer, WD1 is the water depth of the first facies layer provided by the initial topography of the model, and WD2min and WD2max are the minimum and maximum values of the water depth corresponding to the second facies layer.

From the accommodation ranges available for each facies log, a value common to all facies logs is inferred. Preferably, this value is an average value of a value range common to the accommodation ranges available for each facies log. If no common value exists, a value is chosen which minimizes the difference between said value and each accommodation range computed for a facies log. This difference is then set as a level of subsidence to be modelled in the simulation program.

Then for the next facies layer a range of accommodation values is computed the same way as before from the common accommodation value obtained for the preceding facies layer, the thickness of the preceding facies layer and the range of water depths assigned to the next layer, and so on until accommodation values are computed for the whole facies log.

Figure 8:
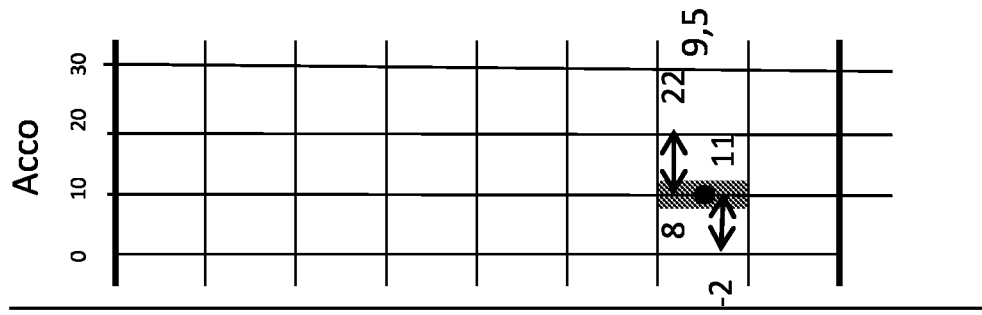
FIG. 8 represents an exemplary implementation of a step of determining environmental factors associated to each layer of sediments to be modelled by the program, in the case of an environmental factor which is heterogeneous over the basin at a given time.
Figure 8:
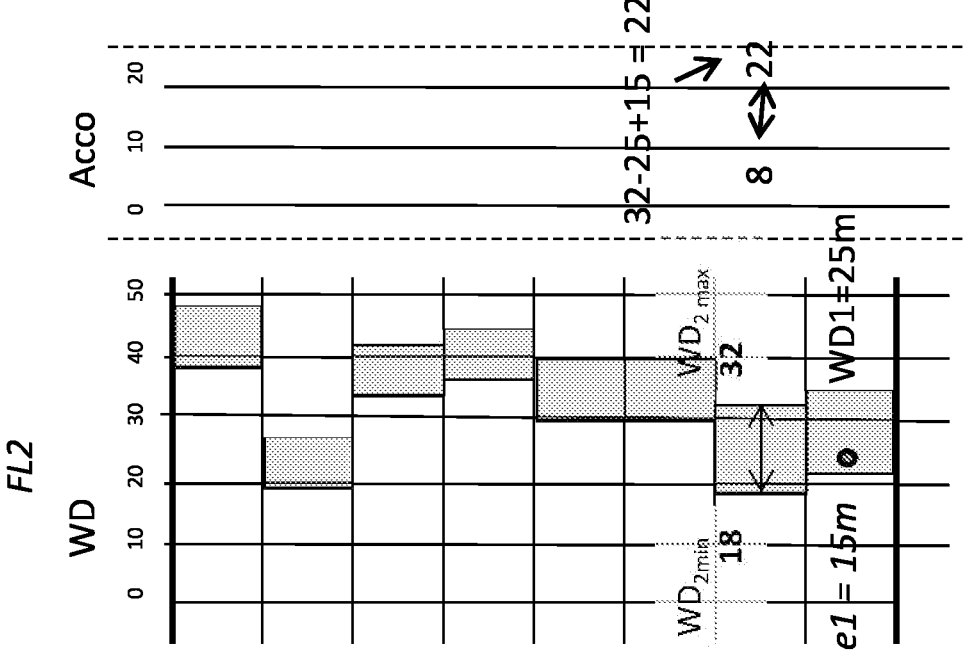

An example of this implementation is shown in FIG. 8, showing two water depths (WD) logs of two respective facies logs (FL). The water depths values are assigned to each of a plurality of parts of the facies logs corresponding to the same period of time.

On the right hand side of each water depth log is indicated the range of accommodation values (Acco) computed as described above.

On the right hand side of FIG. 8 is shown the value range at the intersection of the accommodation ranges computed for each log, and the accommodation value chosen among this range for the considered facies layer, which will be used for the next facies layer.

The above described method thus allows establishing a correspondence between the simulation of the modelling of a sedimentary basin and actual data obtained from wells belonging to the sedimentary basin. The stratigraphic forward modelling program can thus have increased precision.

The invention claimed is:

1. A computer-implemented method for modelling the formation of a sedimentary basin using a stratigraphic forward modelling program, wherein the stratigraphic forward modelling program simulates the superposition of successive layers of sediments, each layer of sediments corresponding to a determined period of time, the method comprising:

receiving a facies log corresponding to an initial state of at least one well belonging to the sedimentary basin to be modelled, wherein the facies log comprises a succession of layers of different facies wherein each layer extends from a respective depth with a respective thickness, determining environmental conditions associated to at least some of the facies of the facies log to infer, for at least one environmental factor, an environmental factor log associated to the facies log, determining, from the facies log, a number of layers of sediments and a thickness of each layer of sediments to be simulated by the stratigraphic forward modelling program for modelling the facies log, and determining, from the environmental factor log associated to the facies log, environmental parameters associated to the layers of sediments to be simulated by the stratigraphic forward modeling program such that the superposition of the simulated layers of sediments corresponds to the facies logs, wherein determining, from the facies log, the number of layers of sediments and the thickness of each layer of sediments to be simulated by the stratigraphic forward modelling program comprises:

determining an average deposition rate of the facies over each facies log, expressed as an average thickness of deposited sedimentary elements during the period of time corresponding to each layer of sedimentary elements, determining the number of layers of sediments to be simulated in order to model each facies log, from the average deposition rate of the facies, a number of different facies within the facies log, and a thickness of each facies layer, computing an average thickness of the layers of sediments as the overall thickness of the facies log divided by the number of layers of sedimentary elements to be simulated in order to model the facies log, and adjusting the thickness of each layer such that a change between two successive facies in the facies log corresponds to an interface between two successive layers of sediments.

2. The computer-implemented method according to claim 1, wherein receiving a facies log corresponding to an initial state of at least one well belonging to the sedimentary basin to be modelled comprises receiving a current facies log corresponding to a current state of the at least one well, and processing the current facies log to form the facies log corresponding to the initial state of the at least one well.

3. The computer-implemented method according to claim 1, wherein determining environmental conditions associated to at least some of the facies of the facies log to infer, for at least one environmental factor, an environmental factor log associated to the facies log comprises loading a library assigning to each of a plurality of facies an associated production model comprising at least one type of element and at least one environmental factor, and inferring from the library at least one environmental factor value and/or at least one element corresponding to each facies layer of the facies log.

4. The computer-implemented method according to claim 1, the at least one environmental factor includes at least one of:

water depth,
   salinity,
   temperature,
   pH level,
   slope of a sedimentary surface on which sediments are deposited,
   water current velocity,
   volcano activity,
   spring activity,
   river activity, or
   variation of water depth between the periods of time corresponding to the deposition of two successive layers of sediments.

5. The computer-implemented method according to claim 1, wherein environmental conditions associated to one facies comprise minimum and maximum values of an environmental factor, and the determination of an environmental factor log comprises:

computing an average value of the environmental factor for each facies of the facies log from the respective minimum and maximum values associated to each facies, the succession of average values corresponding to each facies of the log forming an environment factor log, and
   smoothing the environment factor log.

6. The computer-implemented method according to claim 1, wherein receiving a facies log corresponding to an initial state of at least one well belonging to the sedimentary basin to be modelled comprises the reception of at least two facies logs corresponding to the initial states of two respective wells belonging to the sedimentary basin to be modelled, and determining environmental conditions associated to at least some of the facies of the facies log further comprises establishing correlations between the facies logs from the environmental factor logs established for each facies log and identifying, from the established correlations, parts of each facies log corresponding to a same time interval.

7. The computer implemented method according to claim 6, wherein said determining, from the environmental factor log associated to the facies log, environmental parameters associated to the layers of sediments to be simulated by the stratigraphic forward modeling program comprises inferring, from each facies log, a maximum water current velocity at water bottom associated to each transported facies layer, the method further comprising running the stratigraphic forward simulation model to model the formation of the sedimentary basin, thereby obtaining a simulated water current velocity at a time and location corresponding to the formation of the transported facies layer of the facies log for which the maximum water current velocity has been inferred, and said determining, from the environmental factor log associated to the facies log, environmental parameters associated to the layers of sediments to be simulated by the stratigraphic forward modeling program further comprises:

computing an error between the maximum water current velocity and the simulated water current velocity, extrapolating the computed error over the sedimentary basin, and computing corrected simulation values of water current velocity from values simulated by the program and the error computed over the sedimentary basin.

8. The computer-implemented method according to claim 6, wherein the environmental factor logs comprise, for each facies log, at least an environment factor log corresponding to an environment factor which is, at a given time, homogeneous over the sedimentapry basin, and comprises, for each part of the facies log corresponding to a time interval, a range of values of said homogeneous environmental factor, and determining, from the environmental factor log associated to the facies log, environmental parameters associated to the layers of sediments to be simulated by the stratigraphic forward modeling program comprises assigning a value of the environmental factor to at least one layer of sediments to be modelled in order to represent facies layers of the part of the facies logs corresponding to the same time interval, said value being comprised in the intersection of the ranges of values of the environmental factor associated to the part of each facies log corresponding to said time interval.

9. The computer-implemented method according to claim 8, wherein if there is no intersection of the ranges of values of the environmental factor associated to the facies layer of each facies log corresponding to said time interval, the method comprises defining a reference facies log, and the value assigned to the layer of sediments to be modelled is chosen among the range of values of the environmental factor associated to the facies layer of the reference facies log corresponding to said time interval.

10. A non-transitory computer readable storage medium, having stored thereon a computer program comprising program instructions, the computer program being loadable into a processor and adapted to cause the processor to carry out, when the computer program is run by the processor, the method according to claim 1.

11. A device for modelling the formation of a sedimentary basin, the device comprising a processor configured to implement the method according to claim 1.

12. A computer-implemented method for modelling the formation of a sedimentary basin using a stratigraphic forward modelling program, wherein the stratigraphic forward modelling program simulates the superposition of successive layers of sediments, each layer of sediments corresponding to a determined period of time, the method comprising:

receiving a facies log corresponding to an initial state of at least one well belonging to the sedimentary basin to be modelled, wherein the facies log comprises a succession of layers of different facies wherein each layer extends from a respective depth with a respective thickness, determining environmental conditions associated to at least some of the facies of the facies log to infer, for at least one environmental factor, an environmental factor log associated to the facies log, determining, from the facies log, a number of layers of sediments and a thickness of each layer of sediments to be simulated by the stratigraphic forward modelling program for modelling the facies log, determining, from the environmental factor log associated to the facies log, environmental parameters associated to the layers of sediments to be simulated by the stratigraphic forward modeling program such that the superposition of the simulated layers of sediments corresponds to the facies logs, wherein the environmental factor logs comprise, for each facies log, at least an environment factor log corresponding to an environment factor which is, at a given time, homogeneous over the sedimentary basin, and comprises, for each part of the facies log corresponding to a time interval, a range of values of said homogeneous environmental factor, and determining, from the environmental factor log associated to the facies log, environmental parameters associated to the layers of sediments to be simulated by the stratigraphic forward modeling program comprises assigning a value of the environmental factor to at least one layer of sediments to be modelled in order to represent facies layers of the part of the facies logs corresponding to the same time interval, said value being comprised in the intersection of the ranges of values of the environmental factor associated to the part of each facies log corresponding to said time interval, and if there is no intersection of the ranges of values of the environmental factor associated to the facies layer of each facies log corresponding to said time interval, the method comprises defining a reference facies log, and the value assigned to the layer of sediments to be modelled is chosen among the range of values of the environmental factor associated to the facies layer of the reference facies log corresponding to said time interval.

13. A computer-implemented method for modelling the formation of a sedimentary basin using a stratigraphic forward modelling program, wherein the stratigraphic forward modelling program simulates the superposition of successive layers of sediments, each layer of sediments corresponding to a determined period of time, the method comprising:

receiving a facies log corresponding to an initial state of at least one well belonging to the sedimentary basin to be modelled, wherein the facies log comprises a succession of layers of different facies wherein each layer extends from a respective depth with a respective thickness, determining environmental conditions associated to at least some of the facies of the facies log to infer, for at least one environmental factor, an environmental factor log associated to the facies log, determining, from the facies log, a number of layers of sediments and a thickness of each layer of sediments to be simulated by the stratigraphic forward modelling program for modelling the facies log, and determining, from the environmental factor log associated to the facies log, environmental parameters associated to the layers of sediments to be simulated by the stratigraphic forward modeling program such that the superposition of the simulated layers of sediments corresponds to the facies logs, wherein receiving the facies log corresponding to the initial state of at least one well belonging to the sedimentary basin to be modelled comprises:

receiving at least two facies logs corresponding to the initial states of two respective wells belonging to the sedimentary basin to be modelled, and determining environmental conditions associated to at least some of the facies of the facies log further comprises establishing correlations between the facies logs from the environmental factor logs established for each facies log and identifying, from the established correlations, parts of each facies log corresponding to a same time interval, and wherein said determining, from the environmental factor log associated to the facies log, environmental parameters associated to the layers of sediments to be simulated by the stratigraphic forward modeling program comprises inferring, from each facies log, a maximum water current velocity at water bottom associated to each transported facies layer, the method further comprising running the stratigraphic forward simulation model to model the formation of the sedimentary basin, thereby obtaining a simulated water current velocity at a time and location corresponding to the formation of the transported facies layer of the facies log for which the maximum water current velocity has been inferred, and wherein said determining, from the environmental factor log associated to the facies log, environmental parameters associated to the layers of sediments to be simulated by the stratigraphic forward modeling program further comprises:

computing an error between the maximum water current velocity and the simulated water current velocity, extrapolating the computed error over the sedimentary basin, and computing corrected simulation values of water current velocity from values simulated by the program and the error computed over the sedimentary basin.

\* \* \* \* \*